United States Patent

[11] 3,609,209

[72] Inventors Herbert James Houston
Oakville, Ontario;
Robert Gordon Baird, Burlington, Ontario;
Kenneth Dale Bolt, Burlington, Ontario;
Adolf Gretzinger, Ancaster, Ontario, all of Canada
[21] Appl. No. 830,002
[22] Filed June 3, 1969
[45] Patented Sept. 28, 1971
[73] Assignee N. Slater Company, Division of Slater Steel Industries Limited
[32] Priority Apr. 9, 1969
[33] Canada
[31] 048,169

[54] SPACER DAMPER
11 Claims, 7 Drawing Figs.
[52] U.S. Cl. .................................................. 174/42, 174/146
[51] Int. Cl. .................................................. H02g 7/12, H02g 7/14
[50] Field of Search ......................................... 174/42, 146; 188/1 B, 102, 103

[56] References Cited
UNITED STATES PATENTS
3,474,184 10/1969 Crosby et al. ............... 174/42
3,475,544 10/1969 Reed ............................ 174/42

OTHER REFERENCES
Wigotsky, " Silicone-Rubber Washers Soothe Vibrating Transmission Lines," Design News, Aug. 18, 1965, pages 114 and 115. Copy in 174–42.

Primary Examiner—Laramie E. Askin
Attorney—LeBlanc & Shur

ABSTRACT: A cable damper for damping vibrations in two parallel electrical cables has a main body and two arms mounted thereon. The arms carry cable clamping means for holding the two cables and are mounted on the body by pivotal mountings which allow for pivotal movement of the arms only about predetermined axes parallel to the cables held by said arms. The pivotal mountings for the arms include resilient energy absorbing means biasing the arms into neutral positions in which positions the arms are inclined to the common plane of said cables. The inclinations are such that the range of angular movement of an arm about said neutral position such as can be caused by vibrations of a cable attached thereto lies between planes through the pivotal axis of said arm respectively parallel to and perpendicular to said common plane.

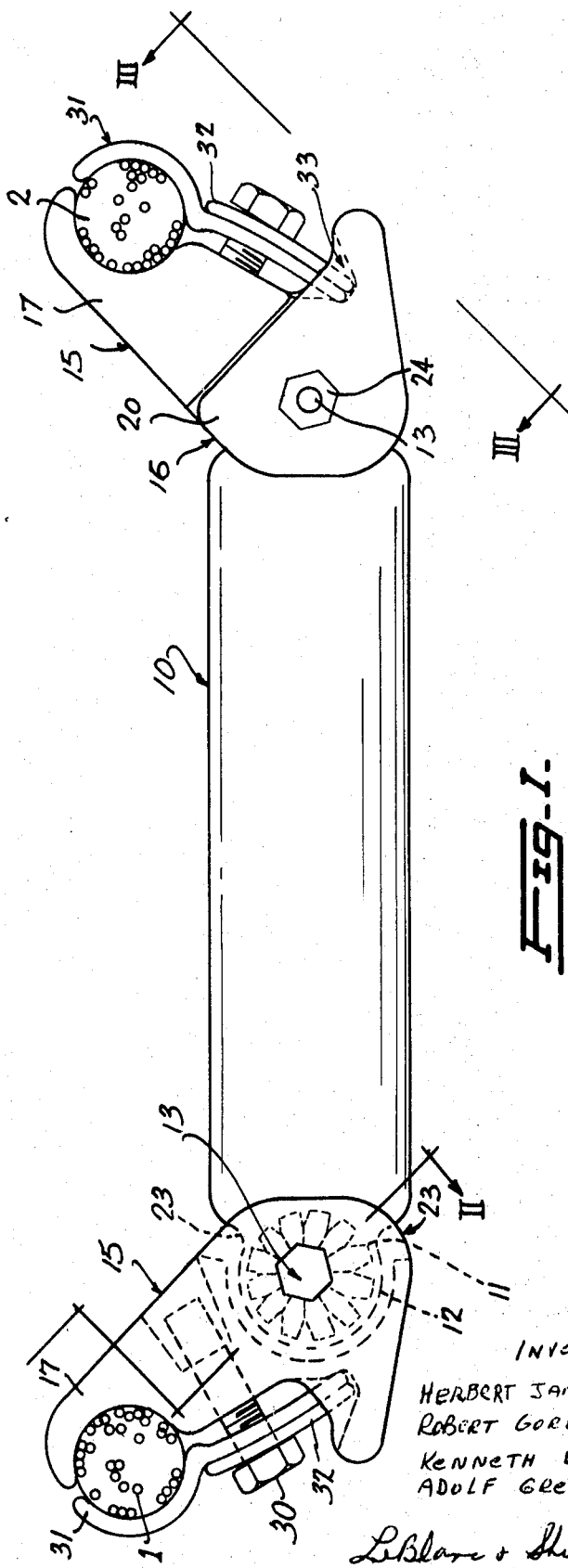

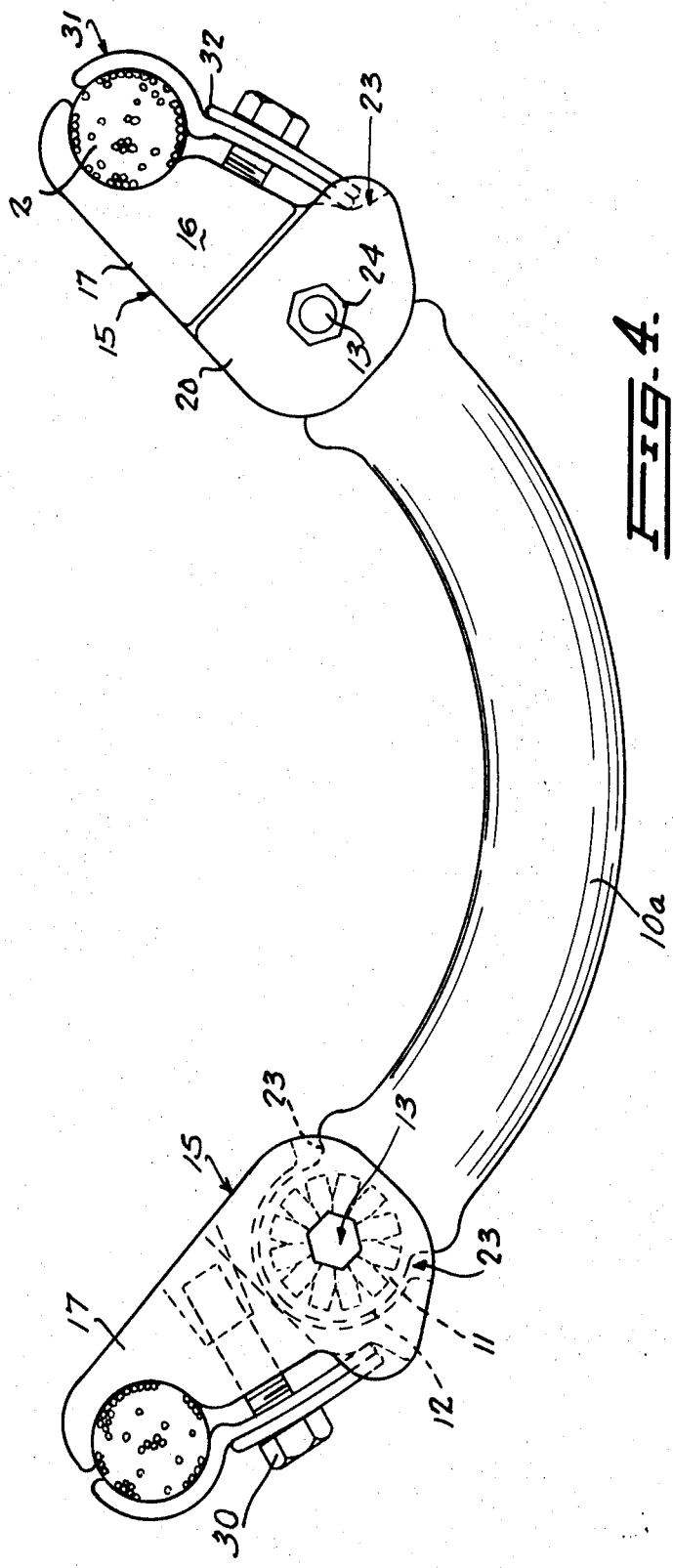

SPACER DAMPER

The present invention relates to cable dampers for overhead electrical transmission lines.

When the cables of a transmission line span long distances between adjacent pylons, wind effects on the cables may cause these to vibrate. Vibrations in such cables may take several forms, the type of greatest importance being referred to as aeolian vibration.

In overhead systems having a single wire or cable, aeolian vibration occurs in relatively light winds, usually from 1 to 15 miles per hour and results from eddies which form on the lee side of the cable. When the frequency of the eddies coincides with one of the many natural frequencies of the cable, the forces arising from the eddies causes the cable to vibrate generally in the vertical plane. This type of vibration is often present for about 50 percent of the time and if permitted to occur without adequate control will result in mechanical failure of the wire or cable, sometimes within a very short period of time.

Transmission lines of today often include several subconductors for each pole or phase, the subconductors being grouped in "bundles." In this type of transmission line, not only does the type of aeolian vibration described above occur, but in addition wind flow over the windward conductor may cause an eddy-vortex system between the adjacent subconductors in the same horizontal plane such as will impart a driving force to the leewards conductor or conductors causing these to vibrate or oscillate in the horizontal plane. This vibration once initiated may convert to a vibration in a plane other than the horizontal, for example at 45° to the vertical. This horizontal vibration may be initiated when the ratio of the conductor or cable diameter to the spacing between conductors or cables is less than about 30 to 1 or may become extremely pronounced when the ratio is in the neighborhood of 10 to 1. The mechanism of the horizontal vibration is very similar to that of the aeolian vibration described above for a single conductor in that the driving force imparted by the eddy-vortex combination will coincide with one of the many natural frequencies of the conductor or cable, causing sustained vibration. The vibrations so caused may be such that the resulting standing waves are in phase for adjacent cables, or the waves may be 180° out of phase. External forces such as ice falling from one subconductor and not the other may cause cyclic movement of one subconductor with respect to the other in the direction of the longitudinal axes of the cable. This motion is generally known in the industry as differential longitudinal motion. The present invention is so constructed as to accommodate this motion.

Where each pole or phase consists of a bundle of several subconductors or cables, it is known to provide spacers situated at intervals along each span, which hold the individual conductors apart and prevent damage which would otherwise occur by cables of a bundle clashing against each other. However, such spacers of themselves will not necessarily prevent the above-described oscillatory motion, which may still occur either in the subspans between the spacers, or in the complete span with consequent movement of the spacers.

To prevent subspan clashing of the cables the spacers must be placed at intervals along the span usually between 200 and 300 feet apart, with shorter spans adjacent the suspension points. The provision of such spacers at these intervals is essential to prevent the conductors from clashing, quite apart from any damping requirement, but it is convenient to use these spacers also as dampers rather than to use larger and less manageable dampers situated only at the suspension points. Spacers which act as dampers for this purpose are known, which are designed to be spaced along the span between the suspension points, and such spacer dampers differ from devices which are concentrated at the suspension points at the ends of a span.

Known spacer dampers include devices which dissipate vibrational energy by twisting the cables so causing the cable strands to rub against each other and frictionally dissipate the energy of vibration. There are also known spacer dampers for attachment to a group of parallel cables of the same pole or phase, such dampers generally having a main body attached to the cables by short arms having cable clamps, the arms being connected to the main body by energy absorbing devices which allow limited angular movement between the arms and the body while absorbing the energy of such movements, and so damping the vibrations. The present invention relates to cable dampers of this latter type.

Known spacer dampers of this type dissipate energy from longitudinal vibrations in the cables, and in some cases vertical transverse vibrations in the cables are also damped. The present invention, however, provides a spacer damper which is effective to damp out transverse vibrations in cables attached thereto both in the horizontal and vertical planes, and this form of damping has been found to be much more effective than that of known dampers.

According to the present invention, a cable damper for damping vibrations in two parallel electrical cables, comprises a main body, and two arms mounted thereon, said arms carrying cable clamping means for holding the two cables, the arms being mounted on the body by pivotal mountings which allow for pivotal movement of the arms only about predetermined axes parallel to the cables held by said arms, the pivotal mountings for the arms including resilient energy absorbing means biasing the arms into neutral positions in which positions the arms are inclined to the common plane of said cables, the inclinations being such that the range of angular movement of an arm about said neutral position such as can be caused by vibrations of a cable attached thereto lies between planes through the pivotal axis of said arm respectively parallel to and perpendicular to said common plane.

The neutral positions are those taken up by the arms when the cable damper is not being stressed by any vibration in the cables.

The inclination of the cable holding arms to the common plane of the cables is to be understood as meaning the angle between the said common plane and the longitudinal axis of each arm passing through its pivot and through the center of a cable held in the clamping means. In the preferred embodiment of this invention, this angle of inclination is 45° for each arm when the arms are in their neutral positions. In this case, the pivotal movement of the arms having cables attached thereto about their neutral positions will be accompanied by transverse movement of the cables relative to the main body which movement will have substantially equal components both parallel to the said common plane of the cables and perpendicular thereto.

However, beneficial results in accordance with this invention can also be achieved where the movement of cables attached to the arms, relative to the main body, has components of the same order of magnitude both parallel to the said common plane of the cables and perpendicular thereto. This may be achieved with inclinations of the arms (in their neutral positions) to the said common plane lying between 25° and 65°. The movement of the arms from their neutral positions will preferably be limited to about 18°, and will normally be less so that with the inclinations of the arms in their neutral positions lying between these limits, the range of movement of an arm will always be within the limits set by planes through the pivotal axis of said arm respectively parallel to and perpendicular to the said common plane.

It is envisaged that the main body of the cable damper will generally be disposed horizontally, and with the arms set at 45° to the said common plane the cables attached thereto will have substantially equal components of movement, relative to the main body, both in the horizontal and vertical planes. The actual movement of the cables will depend, however, on the motion of the main body, and this will depend on the phasing of the vibrations in the cables. The spacer damper may alternatively be mounted with its main body vertical, between a horizontally disposed pair of cables.

The main body of the cable damper may be straight, in which case the arms (assuming these are of equal length) will preferably lie at 45° to the main body. However, the main body may be a curved member in which case the arms may extend in the same directions as the ends of the body.

The cable damper has been defined by reference to its connection to two cables, but dampers within the scope of the invention may be used with more than two cables. In this case the main body will be in the form of a frame having arms for holding each cable in addition to the two arms referred to, so that all the cables held by such arms can vibrate both parallel to the said common plane and perpendicular thereto.

A further feature of the present invention is the use of a main body of sufficient inertial mass, so that vibrations in the cables tend to cause movement of the arms on the body rather than undue movement of the body itself, whereby the vibrations are effectively damped.

The invention will now be described by way of example with reference to the accompanying drawings, in which:

FIG. 1 is a side elevation of a cable damper according to the invention,

FIG. 4 is a side elevation of a second embodiment of cable damper according to the invention.

Figure 3:
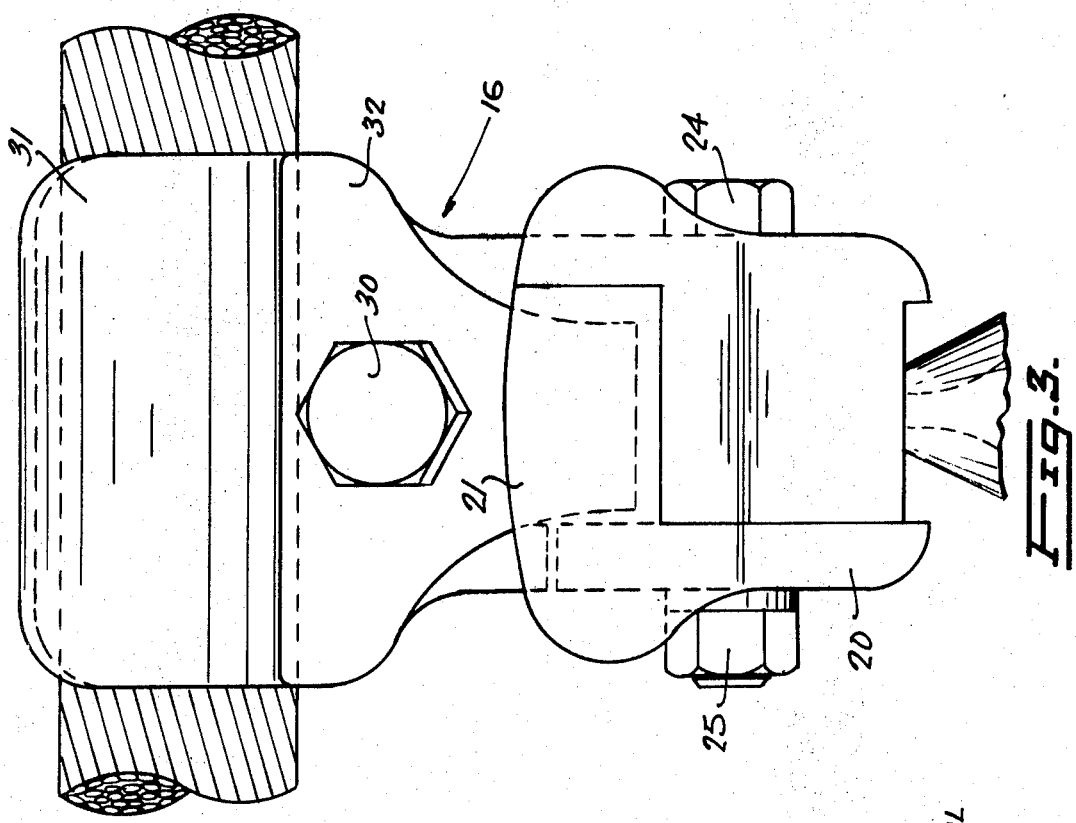
FIG. 3 is a view on line III—III of FIG. 1.
Figure 2:
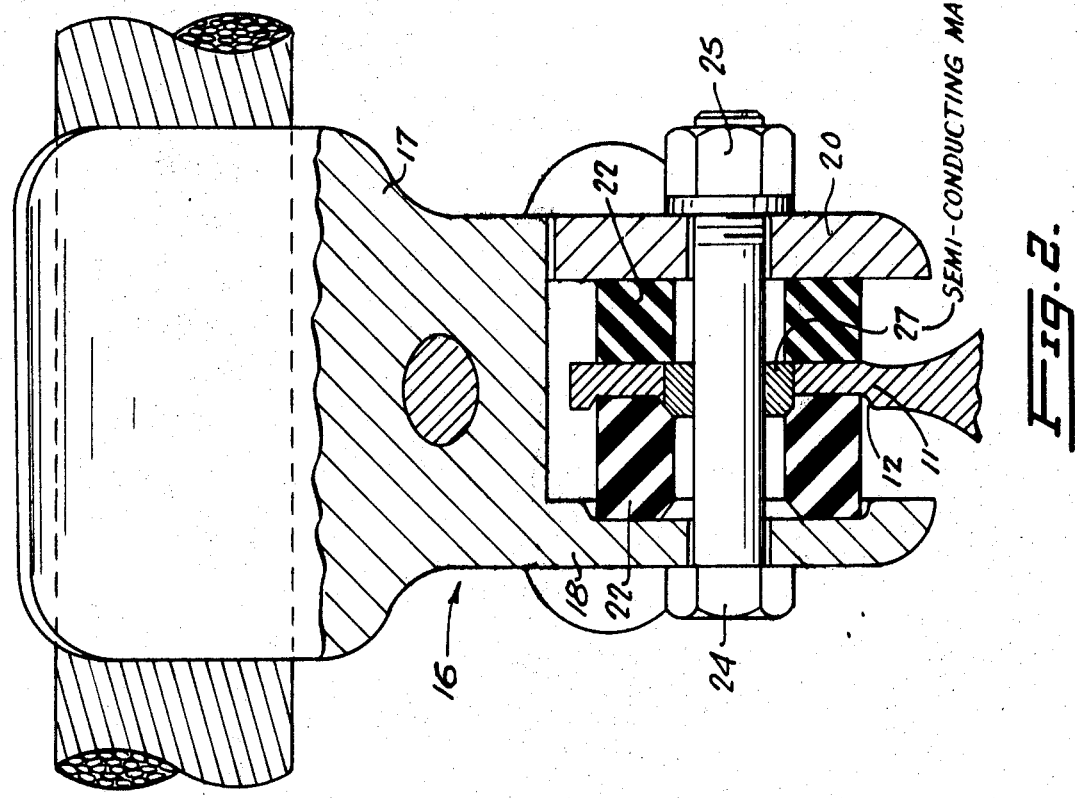
FIG. 2 is a partial cross section on line II—II of FIG. 1.

Referring now to FIGS. 1-3, a spacer damper is shown for holding a pair of adjacent cables 1 and 2, both of the same electrical potential. In practice, several similar spacer dampers will be spaced along the same pair of cables in each span connecting neighboring pylons, and further dampers will be used for other pairs of cables of different pole or phase.

The spacer damper comprises a main body 10 of, for example, forged steel, having at each end a flattened tongue 11. Each tongue 11 is part circular in shape, and has a central bore surrounded on both sides of the tongue by an annular area of radial corrugations indicated at 12.

The main body 10 is sufficiently heavy to have an inertial mass effective for damping purposes.

At each end of the body 10 a cable clamp arm 15 is mounted in a manner to be described, so as to be pivotal about an axis indicated at 13 passing through the central bore of each tongue 11 and extending parallel to the cables 1 and 2. As shown, the arms 15 are inclined to the common plane of the cables 1 and 2, and the drawing shows the neutral positions of the arms in which the axis of each arm joining the center of the clamped cable to the pivotal axis 13 of the arm lies at approximately 45° to this common plane, which in this case is parallel to the main body 10.

The main part of arm 15 is a casting 16, for example, of aluminum which includes a cylindrically grooved portion 17 forming one-half of a cable clamp, and which has an integral extension in the form of a centrally bored sideplate 18 which, on assembly, overlaps with the tongue 11 of the main body. On the opposite side of tongue 11 to the sideplate 18 is arranged a separate sideplate 20 similar to plate 18 and also centrally bored, and which fits into a suitably shaped recess in the side of the casting 16. The innner faces of the sideplate extension 18 and sideplate 20 both have annular areas of radial corrugations surrounding the central bores, matching the facing corrugations of the tongue 11. The casting 16 and sideplate 20 engage with each other, as by means of the sideplate extension 21, to define a predetermined space between the opposed corrugated faces.

Between the adjacent corrugated faces of the sideplates 18 and 20 and tongue 11 are held two thick elastomer washers 22 of nonconducting silicone rubber or other suitable material. These washers 22 have radial corrugations in their side faces which engage with the corrugations of the adjacent faces of the sideplates 18 and 20 and tongue 11. These corrugated faces are all held in tight engagement by a bolt 24 passing through the bores of the sideplates 18 and 20 and through the centers of washers 22 and the bore of the tongue 11, the bolt having at its outer end a nut 25 holding a lock washer in engagement with the outside of the plate 20. The nut 25 holds the casting 16 and the sideplate 20 together in such a manner that the washers 22 are compressed into the predetermined spaces between the tongue 11 and the inner faces of sideplates 18 and 20. The washers are of such thickness, in relation to this space, as to be compressed by between 18 percent and 25 percent of their original thickness, the material of the washers having suitable resilient and damping properties within this range. With this compression the engagement of the corrugated faces of the washers and the metal parts is such as definitely to preclude slipping between these surfaces due to pivotal movement of the arms which occurs in practice. Thus any force tending to move the clamp arm 15 about the pivot formed by the bolt 24 is resisted by shear forces in the washers 22, which bias the arms into their neutral position as shown and also absorb energy during this movement.

Pivoting of the arms 15 on the body 10 is limited to an angle of about 18° on each side of the neutral position by engagement between the main body of casting 16 and shoulders 23 on the tongue 11 at each end of the body 10. These means prevent excess movement of the arms which might otherwise cause damage to the rubber washers when short circuits impose extremely high forces between the adjacent cables.

The central bore of tongue 11 is slightly larger than the inside diameter of the washers 22. Before assembly of the parts just described, a small sleeve 27 of semiconducting material is inserted into the bore of the tongue 11, in which it fits tightly, and when the washers 22 are assembled on either side of the tongue 11 these hold the sleeve 27 in place. The internal diameter of sleeve 27 makes close contact with the shank of bolt 24 and when the parts are assembled as shown the semiconducting sleeve 27 forms an electrically conducting path between the electrically conducting body 10 and the arm 15, so that a limited current can flow between the main body and each arm. This conducting path reduces the potential differences between the adjacent parts, which tend to occur by reason of the electric fields surrounding the parts, and which would give rise to radio interference if allowed to rise high enough to give sparkover.

The same effect of equalizing potential differences between the body and arm may be achieved by using semiconducting materials such as neoprene or natural rubber for the washers 22 as disclosed and claimed in Canadian Pat. No. 576,710 or by providing a metallic bridge.

The casting 16 is provided with a threaded bore in which a bolt 30 engages, this bolt 30 holding a keeper plate 31 which has its outer end bent to form a cylindrical groove complementary to that of casting portion 17. The bolt 30 has a compressible insert in the threads to prevent loosening under vibration. A washer plate 32 is interposed between the keeper plate 31 and the head of the bolt 30. The inner straight ends of the plates 31 and 32 fit into a recess 33 formed between the casting 16 and a lateral extension of the sideplate 20.

When the clamp formed by casting portion 17 and plate 31 is attached to a cable 1, 2 by tightening the bolt 30 to a required torque, the keeper plate 31 and washer plate 32 both deflect slightly, and thus can maintain a strong clamping pressure on the cable, preventing this from moving in the clamp, even if the cable compresses slightly after the bolt has been finally tightened. Further particulars of this clamping arrangement, with details of the plates 31 and 32 required for particular cables, are given in our copending patent application Ser. No. 829,263 filed June 2, 1969.

In operation, cable dampers of the type described are clamped to the two cables 1 and 2 which are in the same horizontal plane, the dampers being spaced at suitable intervals along the cable spans and the clamps being tightened sufficiently to prevent twisting of the cables within the clamps.

In the event of any transverse vibrations being set up within the cables by wind forces, the main body 10 will tend to remain substantially stationary due to its inertia, and the vibrations in the cable, whether horizontal or vertical, will tend to produce small angular movements of the arms 15 about the pivots formed by bolts 24. The bolts 24 allow for movement of the arms only about the predetermined axes of said bolts, these axes being parallel to the common plane of the cables. These angular movements apply shear to the washers 22, which act as energy-absorbing means since these shear movements of the rubber occur with a hysteresis loss. The washers 22 bias the arms into the neutral position as shown in the drawing so that the cables tend to oscillate about this position. Since the axes of the arms 15 are inclined at approximately 45° to the common plane of the cables, the small angular movements of the arms about their pivots will be accompanied by transverse movements in the associated cables in planes which are at approximately 45° to the common plane of the cables, so that such movements have substantially equal components both parallel to the said common plane and perpendicular thereto. Accordingly, when the spacer damper is mounted horizontally as shown, it is effective to damp out cable vibrations both in the horizontal and vertical planes. It will be particularly noted that the pivotal movements of arms 15 allows the spacing between the cables to vary, so that damping is particularly effective with horizontal vibrations in the two cables which are out of phase in such a manner as to continuously vary the cable spacing. However, the inertial mass of the body with respect to the conductors is sufficient to be effective even when the horizontal motion of the conductors is in phase.

The cable damper shown in FIG. 4 is similar in all respects to that of FIGS. 1-3, except in that the main body 10a is curved as a circular arc. The curvature is such that with the arms 15 extending in the same direction as the ends of the main body, these arms lie at an inclination of about 45° to the common plane of the two pivotal axes. All parts of this damper apart from the body 10a are the same as those in the first-described damper, and the same parts are identically referenced.

Figure 5:
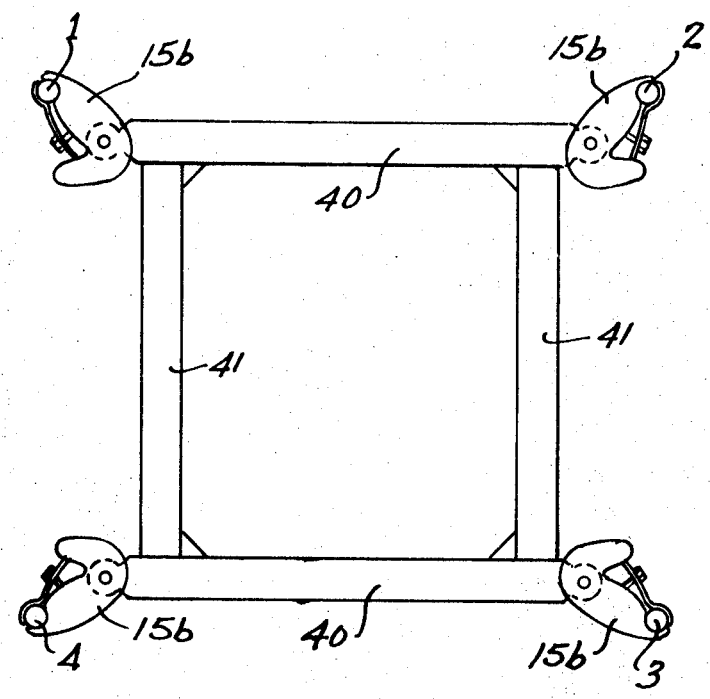
FIG. 5 is a side elevation of a third embodiment of cable damper according to the invention.

FIG. 5 shows diagrammatically a spacer damper for holding four cables 1, 2, 3 and 4. This damper has a main body in the form of a frame having horizontal body members 40 connected at their ends by vertically disposed connecting members 41. The members 40 and 41 together form a rigid rectangular frame, and pivotal cable clamp arms 15b each holding one of the four cables extend from the corners of the frame each at an angle of about 45° to the sides of the frame. The arms 15b are attached to the corner points of the frames by resilient energy absorbing means, allowing a limited degree of pivoting around a neutral position, and these arms and their attachment means are identical to those described with reference to FIGS. 1-4. Again, angular movement of the arms about the neutral positions (shown) caused by incipient vibrations in the cables allows damped transverse movement of the cables both in the common horizontal planes of adjacent cables 1 and 2, and cables 3 and 4, and also perpendicular thereto.

A frame arrangement may also be used for connecting together more than two pairs of cables, for example six or more cables, still allowing each cable damped transverse movement of the cables with components both in the common horizontal planes of adjacent cables, and in planes perpendicular thereto. Such frames would include three or more horizontal body members having pivotal clamp arms extending therefrom at angles of about 45°, the arms being connected to the frame by resilient energy-absorbing means of the type described.

Where two or more pairs of cables at the same potential are suitably spaced, the use of a frame arrangement as described is preferable to the use of several separate two cable connectors, since the frame gives additional restraint to movements between vertically disposed pairs of cables, and is particularly effective for damping out vertical, out of phase vibrations in such pairs.

Figure 6:
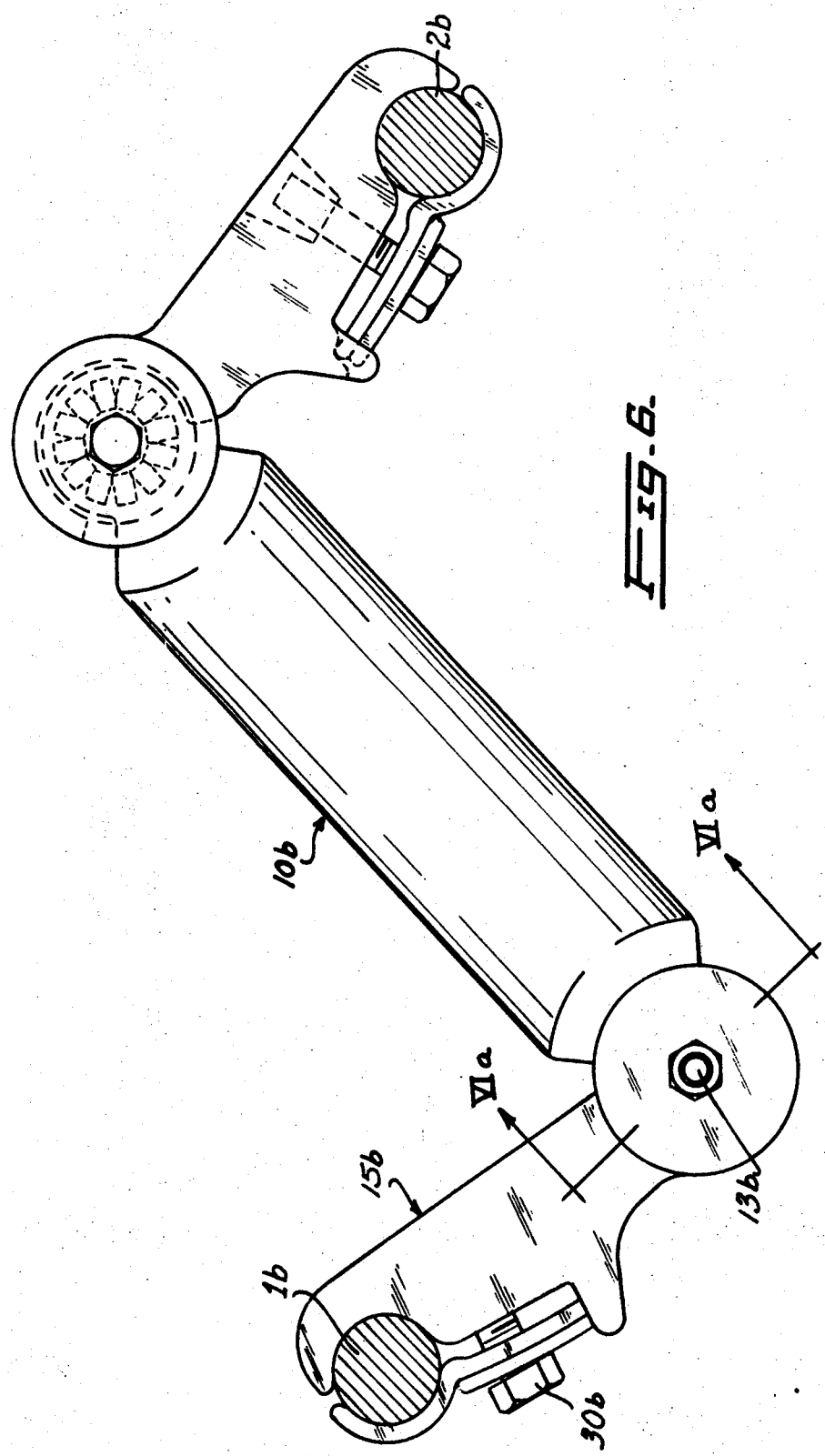
FIG. 6 is a side elevation of a fourth embodiment of cable damper according to the invention.
Figure 6A:
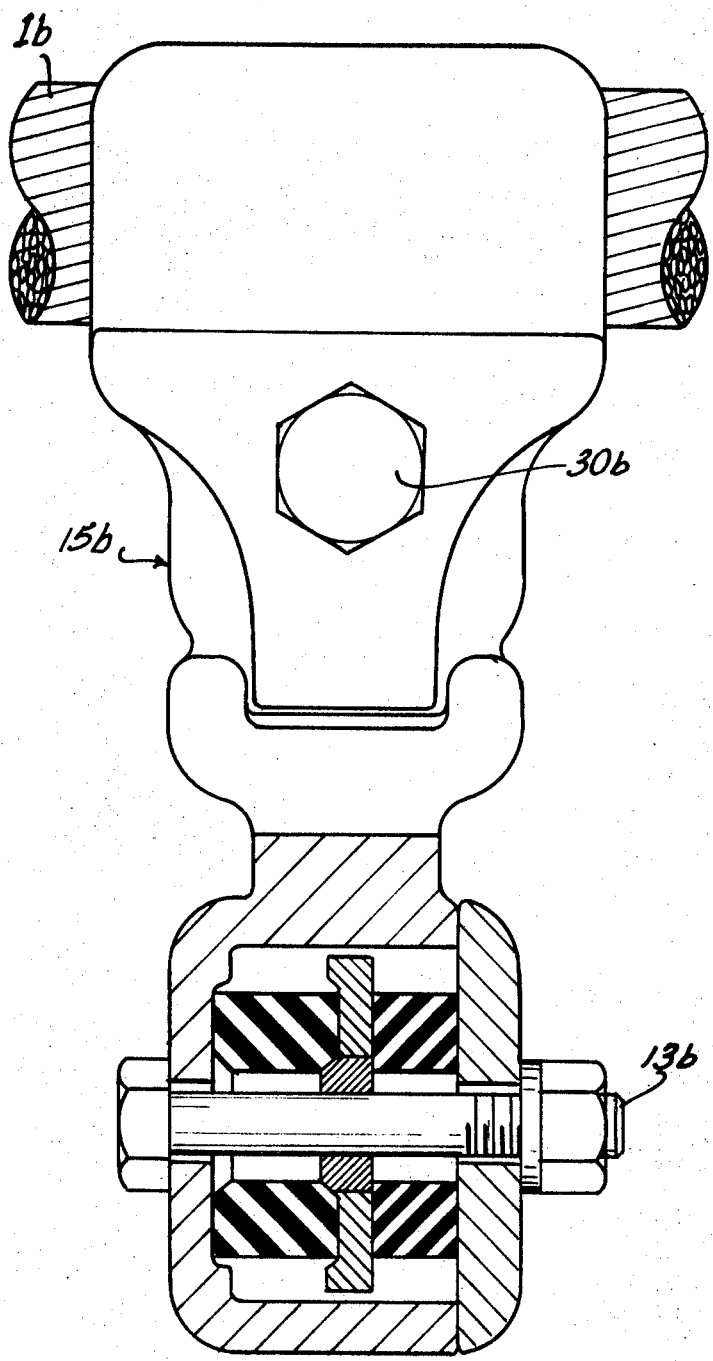
FIG. 6a is a section take along the line VIa—VIa of FIG. 6.

FIGS. 6 and 6a show a further alternative embodiment of spacer damper for holding two cables. The main components of the damper are similar to those of the damper shown in FIGS. 1-3 and are similarly referenced but with the suffix b. In this embodiment, however, the arms 15b extend on opposite sides of a plane passing through the pivotal planes of the two members 10b which joins the two pivotal axes and is inclined to the horizontal common plane of the two cables 1b and 2b. Also, the arms 15b, which are approximately half the length of the body member 10b extend approximately perpendicularly to the body member 10b, when in their neutral positions. It will be seen from the geometry of this embodiment that, as in proceeding embodiments, the arms 15b are inclined at about 45° to the common plane of the cables 1b and 2b.

We claim:

1. A cable damper for damping vibrations in two parallel electrical cables, comprising:
    a. a main body, and two arms mounted thereon,
    b. said arms carrying cable clamping means for holding the two cables therebetween,
    c. the arms being mounted on the body by pivotal mountings which allow for pivotal movement of the arms only about predetermined axes parallel to the cables held by said arms,
    d. the pivotal mountings for the arms including resilient energy-absorbing means biasing the arms into neutral positions in which positions the arms are inclined to a common plane,
    e. said energy-absorbing means being disposed intermediate predetermined spaces formed by at least a part of each of normally vertically disposed surfaces of said arms and said body in the area of pivotal connection thereof so as to prevent contact of said surfaces in operation,
    f. said energy absorption means being of a thickness sufficient to provide a compression factor to substantially preclude slippage as between the surface of said energy absorption means and the surfaces of said body when pivotal movement occurs,
    g. said energy-absorbing means being in the form of normally vertically disposed and generally disk-shaped resilient washers which are disposed in a plane defining a path transverse of said common plane whereby the maximum shear stress on said washers occurs in a plane perpendicular to the plane of pivotal movement of said arms,
    h. the pivotal movement of said arms on said body being such that the range of angular movement of an arm about said neutral position such as can be caused by vibrations of a cable attached thereto lies between planes through the pivotal axis of said arms respectively parallel to and perpendicular to said common plane,
    i. wherein said neutral positions of the arms are such that the axis of each arm passing through the center of the clamped cable and the pivotal axis of the arm lie at an inclination of between 25° and 65° to the said common plane.

2. The cable damper defined in claim 1 wherein each washer has one face in contact with the surface of an arm of said damper and the other in contact with the body of said damper.

3. The cable damper defined in claim 1 wherein the faces of each washer are provided with deformations for gripping with mating surfaces on the arm and body of said damper.

4. The cable damper defined in claim 3 wherein said deformations of the washers are radial corrugations and the surfaces of the arms and body which contact the washers have mating corrugations to receive the corrugations of the washers in gripping relationship.

5. The cable damper defined in claim 1 wherein the energy absorbing means are compressed between 18 percent and 25 percent.

6. A cable damper defined in claim 1 wherein the said neutral positions of the arms are such that an axis passing through the center of a cable clamping means of one arm and the center of the pivotal mounting of the same arm forms an angle of 45° with an axis which passes through the center of the cable clamping means for the two cables.

7. A cable damper according to claim 1, said washers being comprised of conducting or semiconducting means such as to make an electrical connection between said arms and said body, said arms and body also being electrically conductive.

8. A cable damper according to claim 1, wherein the body is in the form of a frame having, in addition to the said two arms for holding cables in a common plane, further arms pivotally mounted thereon, each arm having clamping means for one cable, and wherein the further arms allow movement of each cable attached thereto, relative to the frame both parallel to the said common plane and in a plane perpendicular thereto.

9. A cable damper as defined in claim 1 wherein the said two arms extend on opposite sides of a central plane passing through the axis of the pivotal mounting of the two arms, whereby said central plane is inclined to a plane which is common to two cables held by said cable-clamping means.

10. The cable damper as defined in claim 1 wherein the said resilient energy absorbing means is comprised of silicone-rubber.

11. A cable damper as defined in claim 1, wherein stop means are provided to limit the degree of transverse movement of each cable clamping means relative to the main body.

UNITED STATES PATENT OFFICE
CERTIFICATE OF CORRECTION

Patent No. 3,609,209                    Dated  September 28, 1971

Inventor(s)  Herbert James HOUSTON et al

It is certified that error appears in the above-identified patent and that said Letters Patent are hereby corrected as shown below:

Col. 4, Line 48 after "in" delete "Canadian Pat. No. 576,710" add

--Canadian Pat. No. 570,780--

Signed and sealed this 24th day of April 1973.

(SEAL)
Attest:

EDWARD M. FLETCHER, JR.            ROBERT GOTTSCHALK
Attesting Officer                  Commissioner of Patents